(No Model.)

J. H. PARKS.
CLINOMETER OR SLOPE MEASURER.

No. 444,196. Patented Jan. 6, 1891.

Witnesses
Geo. E. Frich
H. F. Riley

Inventor
James H. Parks
By his Attorneys,
C. A. Snow & Co.

UNITED STATES PATENT OFFICE.

JAMES HARVEY PARKS, OF CLARENDON, TEXAS.

CLINOMETER OR SLOPE-MEASURER.

SPECIFICATION forming part of Letters Patent No. 444,196, dated January 6, 1891.

Application filed July 29, 1889. Serial No. 319,123. (No model.)

*To all whom it may concern:*

Be it known that I, JAMES HARVEY PARKS, a citizen of the United States, residing at Clarendon, in the county of Donley, State of Texas, have invented a Clinometer or Slope-Measurer, which is a new and useful instrument for the purpose of measuring the slopes of embankments, cuts, roofs, or other slopes; and I do declare that the following is a full, clear, and exact description of the invention, which will enable others skilled in the art to which it belongs or appertains to make and use the same.

The invention relates to improvements in clinometers.

The object of the present invention is to provide a simple and inexpensive device for taking measurements in prismoidal formula and to avoid the calculation of the triangle and enable the slope to be readily written from the instrument.

The invention consists in the construction and novel combination and arrangement of parts hereinafter fully described, illustrated in the accompanying drawings, and pointed out in the claim hereto appended.

Figure 1:
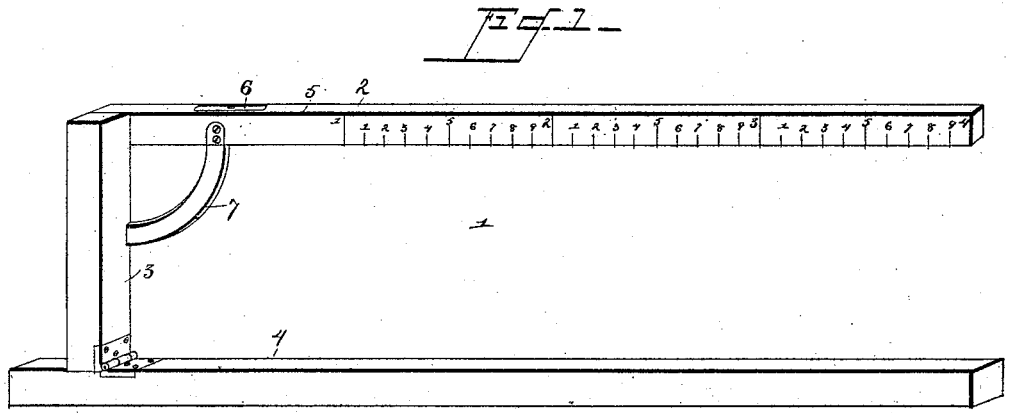
Figure 2:
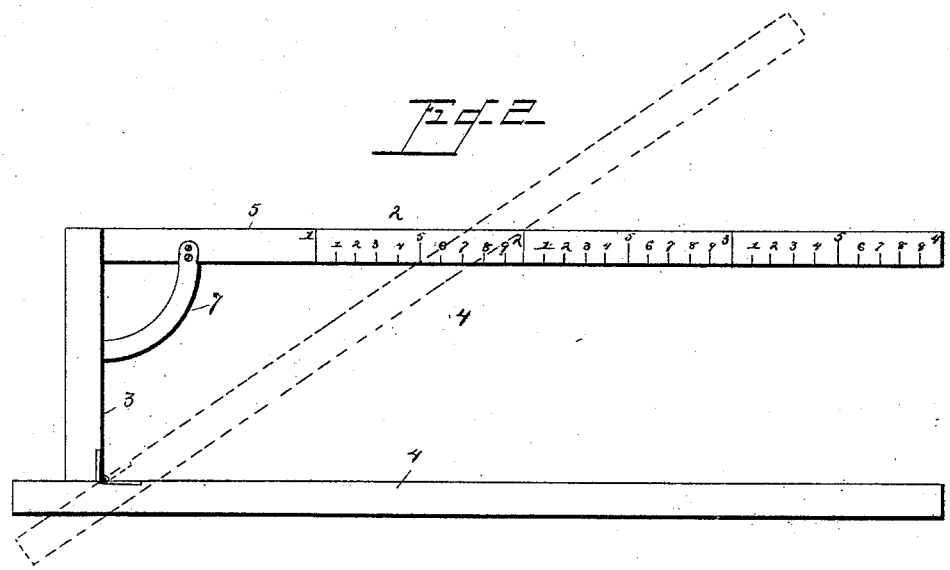

In the drawings, Figure 1 is a perspective view of a clinometer embodying the invention. Fig. 2 is a side elevation of the same.

Referring to the accompanying drawings, 1 designates a square composed of a bar 2, forming the long arm, and a bar 3, forming the short arm, and secured to the end of the bar 2 at one side to permit a bar 4, hinged to the outer end of the short arm and arranged in the same plane as that bar to move over the face of the long arm or bar 2 of the square. The outer face 5, which is the upper face of the bar 2 when the instrument is in proper operative position, is provided with a spirit-level 6 to indicate when the long arm or bar 2 is horizontal or level, and the arms or bars of the square are supported by a curved brace 7. The long arm of the square is divided into units by the short arm, and these units are subdivided into tenths or tenths and hundredths to facilitate calculation. When the hinged bar moves to the position indicated in dotted lines in Fig. 4, the instrument makes a triangle, in which the length of the bar 3 is the unit, or one, and the indicated length of the bar 2 is 1.5, or one and one-half. The measure of the slope can be written thus: 1.5 to 1, or $1\tfrac{5}{1}$, or simply 1.5.

This instrument is designed to be used principally for taking measurements for prismoidal calculation, and is to save the calculation of the triangle.

What I claim is—

A measuring-instrument comprising the square composed of the stationary short bar or arm 3 and the stationary long bar or arm 2, rigidly secured to one side of the short arm or bar and provided on its face 5 with a spirit-level and having a scale of graduations of which the length of the short bar or arm is the unit, the curved brace connecting the said parts, and the movable bar 4, hinged to the short bar or arm and adapted to move freely across the face of the long arm or bar, substantially as described.

JAMES HARVEY PARKS.

Witnesses:
JAMES T. OTEY,
W. R. BUTLER.